Patented Oct. 26, 1948

2,452,315

UNITED STATES PATENT OFFICE 2,452,315

PLASTICIZED PROLAMINE-BASE PROTEIN COMPOSITIONS

Willard L. Morgan, Columbus, and Carl R. Faelten, Clinton Township, Franklin County, Ohio, assignors, by direct and mesne assignments, to American Maize-Products Company, a corporation of Maine No Drawing. Application April 9, 1945, Serial No. 587,436

23 Claims. (Cl. 106—153)

This invention relates to novel plasticizers for prolamines and "prolamine-base" proteins, and to the resultant plasticized compositions. More particularly, there are described plastic compositions, methods of forming such compositions and articles thereby secured, in which prolamines such as zein, corn protein or other cereal prolamines or their derivative proteins are plasticized by imides. In such manner there may be employed N - (butyl) butanimide, N - (butyl) succinimide, N-1-methylolpropylphthalimide, and like imides.

It is an object of this invention to provide novel plasticized "prolamine-base" protein compositions.

It is another object of this invention to provide novel prolamine compositions with plasticizers exhibiting highly desirable compatibility and solvency for the prolamines, which permits the preparation directly of plastic masses, coatings and films with the prolamines.

It is a still further object of this invention to provide novel prolamine compositions having plasticizers for prolamines of improved compatibility characteristics which compositions may be applied in solvents as adhesives or coatings, or thus applied in forming films or plastics.

Other and ancillary objects of this invention will be apparent from the detailed description and examples thereof hereinbelow set forth.

The prolamines have long been established as exhibiting certain properties unique among the proteins, and as such have been classified by workers dealing with proteins as a separate group thereof. By such classification, the prolamines are those proteins characterized by solubility in aqueous ethyl alcohol. They are found only in cereal grains and, contrasted to other proteins, are high in the amino acid proline and amide nitrogen content, and are deficient in free amino groups and in lysine. They are very nearly or entirely insoluble in water and weak aqueous acid solutions, but are freely soluble in dilute alkali solutions in water.

Although in the following description and examples reference will be made to the particular prolamine zein which is derived from corn, it is to be understood that this invention is equally applicable to the other prolamines, that is, to hordein, derived from barley; to kafirin, derived from sorghum; to gliadin, which is derived from wheat; and to the cereal glutens generally.

The diverse and potentially large-scale utilization of plasticized prolamine compositions has long been attractive, and the discovery of satisfactory plasticizers for the prolamines in general, and, in particular, for the prolamine zein which is of industrial importance, has been the object of extensive investigations. Various plasticizers for this purpose have been proposed, but most of such prior art materials have exhibited low plasticizing activity or undesirable characteristics such as incomplete compatibility, high melting point, strong odors, water solubility or rapid loss by volatilization from the prolamine, thereby, and in other ways, resulting in compositions which are unsatisfactory commercially in one respect or another.

In this invention there is set forth the surprising discovery that cyclic organic imides and substituted imides function as remarkably effective plasticizers for the prolamines. Furthermore, most imides show a highly desirable high boiling point and low solubility in water but good solubility in prolamine solvents such as alcohol. Many of these can be made at low cost and in the case of imides containing hydroxy groups they are odorless and often liquid.

As a class of organic compounds the imides may be considered to be the nitrogen analogs of dicarboxylic acid anhydrides. Thus from the viewpoint of molecular structure the cyclic organic imides may be visualized as that organic ring structure resulting when one molecule of ammonia is eliminated from a diamide or a monosubstituted diamide.

Thus, the imides useful as prolamine plasticizers are characterized by an organic ring that may be represented by the general formula

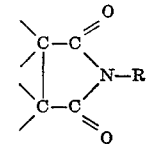

wherein R may represent hydrogen or organic groupings of any nature such as an alkyl, alicyclic, aryl, alkyl aryl, or heterocyclic group; and wherein C, O and N represent carbon, oxygen and nitrogen, respectively. It will be noted that the imides are characterized by an organic ring structure containing a nitrogen atom and four carbon atoms joined to form the ring, and that the two carbons adjacent to the nitrogen carry oxygen and thus are carbonyl groups. Upon the other two carbon atoms in the ring there may be attached at the bonds shown either hydrogen, or organic groups of alkyl or aryl nature or a common aryl or alicyclic organic ring may be bonded through both such carbons.

As compounds we employ as plasticizers in the plasticized prolamine compositions of the present invention such simple imides as succinimide, alkyl succinimides, phthalic imide and "petrex" imide, and the nitrogen substituted or otherwise substituted derivatives of these simpler compounds. We prefer to use imides in the present invention in which the total number of carbon atoms in the molecule is not in excess of fourteen since compounds having more than this number of carbon atoms exhibit greatly diminished plasticizing activity for the prolamines and hence are of limited if any applicability as plasticizers for the prolamines. It will be apparent that the simplest imide, namely succinimide, or butanimide, contains four carbon atoms. Generally, the activity of the compounds as solvents and plasticizers for prolamines is enhanced by the presence of ether, hydroxyl, or amino groups in the imide molecule. Such substitution often will tend to increase the water solubility of the compound and generally where water solubility is to be avoided we have found it desirable not to have more than one hydroxyl or amino group present in the imide molecule for each three carbon atoms present. While it is apparent that the water solubility and boiling point as well as the direct compatibility and solvency will thus vary with the molecular size of the compound and with the other organic groups present, it is also apparent that suitable characteristics in all of these repects may be secured depending upon the choice and number of such organic groups present with respect to the molecular size. Unsaturation present between adjacent carbon atoms, the presence of phenyl radicals or of branch chains, in the substituted imide molecule generally also desirably influences the plasticizing activity. The imides may also carry organic groups which may be substituted by ester linkages, ketone groups or halogens, but generally the presence of these groups has been found not to increase the plasticizing activity but often to be slightly adverse in giving somewhat poorer solvent effects and compatibility.

Hereinafter are given compounds which are typical of some of the various cyclic organic imides and similar substituted imides hereinabove described which have been found eminently satisfactory in the practice of the present invention.

Table I shows formulas for types A to E of imides having the radical R in the formula, which R may be hydrogen, or an organic radical such as those shown in Table II.

*Table I.—Types of imides*

| Type | Formula |
|---|---|
| A | 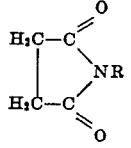 |
| B | 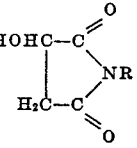 |
| C | 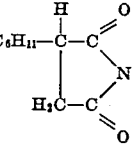 |
| D | 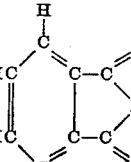 |
| E | 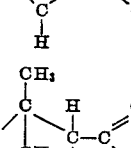 |

Table II shows in the first column an "item" of which the letter represents the type of imide of Table I, and the numeral represents a specific formula for the R of Table I. The second column is the specific imide by name, and the third column designates R in detail.

*Table II.—Imides*

| Item | Name | R |
|---|---|---|
| A-1 | Butanimide (or Succinimide) | —H |
| A-2 | N-(Amyl)butanimide | —C$_5$H$_{11}$ |
| A-3 | N-(2-Ethylhexyl)butanimide | 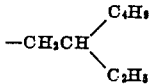 |
| A-4 | N-(Cyclohexyl)butanimide | 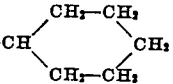 |
| A-5 | N-(Benzyl)butanimide | —CH$_2$.C$_6$H$_5$ |
| A-6 | N-(2-Hydroxypropyl)butanimide | —CH$_2$CHOHCH$_3$ |
| A-7 | N-(1-Methylolpropyl)butanimide | 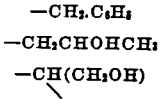 |

Table II.—Imides—Continued

| Item | Name | R |
|---|---|---|
| A-8 | N-(1-Dimethylolpropyl)butanimide | $-\underset{C_2H_5}{C(CH_2OH)_2}$ |
| A-9 | N-(Aminoethyl)butanimide | $-CH_2CH_2NH_2$ |
| A-10 | N-(Diaminodiethyl)butanimide | $-CH_2CH_2NHCH_2CH_2NH_2$ |
| A-11 | N-(Aminohexyl)butanimide | $-(CH_2)_6NH_2$ |
| A-12 | N-(Furfuryl)butanimide | $-CH_2-\text{(furyl)}$ |
| A-13 | N-(Parahydroxyphenyl)butanimide | $-\text{C}_6\text{H}_4-OH$ |
| B-1 | N-(Hydroxyethyl)-2-hydroxybutanimide (or N-(hydroxyethyl)-malic-imide). | $-CH_2CH_2OH$ |
| C-1 | Hexenyl-butanimide | $-H$ |
| C-2 | N-(Hydroxyethyl)hexenyl-butanimide | $-CH_2CH_2OH$ |
| D-1 | N-(allyl)phthalimide | $-CH_2CH=CH_2$ |
| D-2 | N-(Amyl)phthalimide | $-C_5H_{11}$ |
| D-3 | N-(Hydroxyethyl)phthalimide | $-CH_2CH_2OH$ |
| D-4 | N-(1-Methylolpropyl)phthalimide | $-\underset{CH_2.CH_3}{\overset{CH_2OH}{CH}}$ |
| D-5 | N-(1-Methylol-1-methyl,ethyl)phthalimide | $-\underset{CH_3}{\overset{CH_2OH}{C-CH_3}}$ |
| D-6 | N-(1-Dimethylolethanol)phthalimide | $-C(CH_2OH)_3$ |
| D-7 | N-(Hydroxyethylaminoethyl)phthalimide | $-CH_2CH_2NHCH_2CH_2OH$ |
| D-8 | N-(2-Hydroxy-3-aminopropyl)phthalimide | $-CH_2CHOHCH_2NH_2$ |
| D-9 | N-(Aminoethoxyethyl)phthalimide | $-CH_2CH_2OCH_2CH_2NH_2$ |
| D-10 | N-(Carboxymethyl)phthalimide-acid | $-CH_2COOH$ |
| D-11 | Sodium salt of N-(Carboxymethyl)phthalimide-acid | $-CH_2COONa$ |
| E-1 | "Petrex" imide (or 3-Isopropyl-6-methyl-3,6-endoethylene-$\Delta^4$-tetrahydro-phthalimide. | $-H$ |
| E-2 | N-(2-Hydroxyethyl)-"Petrex"-imide | $-CH_2CH_2OH$ |

Methods for preparing imides are well-known and either the simple imides or the nitrogen substituted imides may be made by heating together suitable di-basic acids or their anhydrides with ammonium acetate, amines, or amine acetates to temperatures in the range 110° C. to 175° C., to eliminate water and cause condensation. The substituted imides may also be made by reacting the nitrogen potassium salts of the simple imides with suitable organic halides according to the well-known Gabriel synthesis. In making the imides of the unsaturated hexenyl-butanimide, there may be employed a hexenyl-succinic-anhydride having the trade name "A S A A," and in making the "Petrex" imides there may be employed the resinous di-basic acid anhydride known as "Petrex."

Mixtures of the cyclic organic imides combined in any proportions whatever with each other constitute effective prolamine plasticizers. These imides may also be employed as plasticizers in prolamine plastics in combination with other known plasticizers such as dibutyl-tartrate or para-toluene-sulfonamide. The amount of plasticizer which may effectively be incorporated with the prolamine to result in a useful, plasticized composition occupies an extremely broad range of percentages based on total product composition, and the amount employed will depend upon the properties desired in the plastic to be produced. For example, if 5 per cent (by weight of the resultant composition) of cyclic organic imide plasticizer used in the present invention be incorporated with, say, the prolamine zein, the plasticized product is hard and tough in character. When on the other hand, increasingly greater percentages of such plasticizer are incorporated with the zein, the resultant compositions exhibit increased flexibility and softness such that at a content of 50 per cent by weight in the product the plastics often resemble many rubber articles. When 80 to 95 per cent by weight of the resultant composition is such plasticizer, the products are permanently soft and tacky. Fundamental product characteristics may be regarded, then, as a function of plasticizer content, and it therefore follows that the amount of plasticizer to be incorporated with a prolamine will be determined by the use to which the product is to be put. Further, it is apparent that not all of the cyclic organic imides are of equal effectiveness as already pointed out, and, by suitable choice of such imide more or less hard plasticized prolamine compositions may be made with a given amount of plasticizer, depending upon which plasticizer is employed. It is evident, then, that a wide range of plasticized compositions is obtainable by means of this discovery, and, further, that product characteristics may be modified at will by judicious choice of the quantity of plasticizer incorporated with the prolamine.

The plasticized compositions resulting from practice of this invention have been found of versatile utilities not only as plastic rods, sheets and molded articles, but also as coatings of various types. Thus, for example, these compositions may be made into solutions and applied as a sizing; utilized for impregnating and coating, particularly for grease and water-proofing purposes, and applied to the production of flexible films, lacquers, wall and floor paints, deck enamels, grease- and moistureproof lacquers for application to metallic surfaces, protective varnishes for printed and other paper surfaces, adhesives, laminated products of various types, plastic compositions, linoleum, oilcloth, and the like. These uses are, of course, cited as being illustrative only of the diverse applications of the novel compositions, and as in no way imposing limitations thereon, there being many related and other uses which will at once be apparent to those skilled in such arts.

In practicing this invention, the optimum quantities of plasticizer to be incorporated to secure the qualities desired for the use to which the resultant composition is to be put, will at once be apparent to those skilled in the respective arts from the further description and examples hereinafter set forth.

As a general procedure, the prolamine and plasticizer may be thoroughly mixed in the desired proportions at room temperature. The mixture may then be heated and maintained at a more or less elevated temperature until homogeneity has been attained, as evidenced by disappearance of the prolamine and plasticizer as individual entities with consequent formation of a single, homogeneous mass. This may be carried out in internal mixing machines or upon plastic milling rolls. Pigments, dyes, fillers, resins and the like may be added to the masses while in these machines. Upon cooling to room temperatures, the plasticized composition will be more or less hard and pliable, depending upon the amount and nature of plasticizer incorporated therein, as hereinabove set forth. In the incorporation of other materials with plasticized prolamine compositions for the production of lacquers, sizing, coating or impregnating materials, printing inks, adhesives, or the like, it is frequently advantageous to mix all of the individual components thereof including solvents at the outset of operations, rather than to plasticize the prolamine preliminarily and thereafter to incorporate the plasticized product with the other compounding materials, although such may be done. However the sequence of such operations is not at all critical, and in general will be governed by the character of the technical operations involved, by the arrangement thereof which results in optimum process economies, and by the established production methods conventionally practiced in each particular industry.

As hereinabove set forth, the plasticizers of the present invention may be employed, alone or in conjunction with other known plasticizers, for various plastic modified prolamine compositions, such as, for example, aldehyde-reacted prolamine plastics. It is well-known to react prolamines with aldehydes, particularly formaldehyde, to form solutions, coatings, and thermosetting plastic compositions of improved water resistance and widely varying properties depending upon the nature and amount of ingredients incorporated therein, and upon the temperature and duration of aldehyde reaction. If desired, the plasticized prolamine compositions of this invention may be aldehyde-cured according to conventional techniques, to result in useful plastics and coating compositions which, after curing, are no longer thermoplastic, but are thermosetting in nature, and by reason of the plasticizers set forth in the present invention are flexible and tough. It is apparent that while aldehyde-curing operations with plastics and coatings are preferably carried out upon conclusion of plasticization of the prolamine material, it is possible to add the plasticizers to solutions of prolamines which have been first reacted with the aldehydes.

As is well-known, the prolamines are a group of proteins characterized by solubility in aqueous alcohol solutions which are found only in certain cereal grains. The well-known prolamines include zein, found in corn, gliadin, found in wheat, hordein, found in barley, secalin from rye, sorghumin from sorghum, and the alcohol-soluble protein extractable from oats. The prolamines constitute a large portion of the protein found in the starchy or endosperm parts of the cereal grains and the proteins are isolated from such starchy portions after the grains have been degerminated, as for example in cornstarch manufacture by the wet-milling process or in the manufacture of wheat or other flours by the dry-milling process. The starches may be removed by mechanical washing action as in the preparation of wheat gluten, by wet kneading of the floury mixture, or they may be removed as in the commercial separation of cornstarch. The protein concentrates thus secured may then be extracted by aqueous alcohol or otherwise treated to produce concentrated or purified alcohol-soluble prolamines as is well-known in the art for producing zein and gliadin. These various prolamines may be used to manufacture prolamine compositions and plastic products and be cured with formaldehyde. Certain modifications of the prolamines have become available, such as for instance zein acetate, or zein modified by heat and water-vapor or water treatment; these may be plasticized with the compounds of the present invention and when compositions or plastics are formed of these with aldehydes the resultant compositions may likewise be plasticized with the cyclic organic imides of this invention.

Prolamine plastic compositions may also be formed from the crude protein concentrates derived directly from the de-germinated cereals when these contain a considerable proportion of a prolamine. Thus, as a suitable corn protein for forming plastics, there may be used the corn gluten resulting from the commercial separation of cornstarch in the wet-milling process, which may contain from 40 per cent to 65 per cent of corn proteins primarily of prolamine nature, a large part being the alcohol-soluble prolamine zein. The non-protein remainder of the gluten consists primarily of starch with small quantities of cellulosic bodies and fatty substances. Partially purified corn glutens such as those produced in Shildneck Patent, U. S. No. 2,274,004 by further removal of starch with acids or as shown in Schopmeyer patent, U. S. No. 2,310,104, wherein fatty materials are removed and which contain 60 per cent to 100 per cent protein content, can obviously be used in making cured corn protein compositions and plastics and aldehyde-cured products, which may be further modified with the plasticizers of the present invention. It will be understood that as the term "prolamine-base" protein is used in the description here given and in the appended claims, there is included by such term not alone the purified prolamines isolated from the various cereal grains, but also cereal protein products and mixtures of cereal proteins produced from the endosperm which contain a considerable proportion of prolamine, and there are also included by such term modified or chemically altered prolamines and aldehyde-cured prolamine products.

The following examples will serve to illustrate, to a more or less limited extent, the scope of the present invention, and the presently more important practical applications thereof. It is to be explicitly understood that the present invention is in no way limited to the applications thereof set forth in these examples, nor to the particular ingredients or to the amounts therein specified, since equivalent ingredients in varying percentages may be used for these and other applications, as will be readily apparent to those skilled in such arts. Thus, for instance, in those examples in which individual solvents or solvent mixtures are employed, it will be understood that any solvent or solvent mixture exhibiting solvency for the prolamine and for the plasticizer will function adequately as a mutual solvent for the unplasticized and for the plasticized prolamine materials. Thus, for example, ethylene glycol monomethyl ether, aqueous ethyl alcohol, aqueous isopropyl alcohol, aqueous diacetone alcohol, diethylene glycol monoethyl ether, and diethylene glycol monomethyl ether, are individually solvents both for zein and for the plasticizers of this invention, and therefore function, either separately or in combination, as solvents for both unplasticized and plasticized prolamine materials. Other solvents such as toluene may be added in certain amounts to such solvent mixtures for certain desirable purposes functioning as auxiliary solvents of which many are known in the prolamine solvent field.

*Example 1*

N-hydroxyethyl-phthalimide is a soft, odorless solid readily melted which has a boiling point of 323° C., and which is insoluble in water. N-(1-methylolpropyl)butanimide, while also odorless and water insoluble, is a liquid which boils at 335° C. Each is a good solvent and plasticizer for prolamines. By weight 70 parts of zein and 15 parts of N-hydroxyethyl-phthalimide and 15 parts of N-(1-methylolpropyl)butanimide were placed in a jacketed internal plastic mixer of the dough type used in the rubber industry and thoroughly mixed at room temperature. The agitated mix was then heated to a temperature not exceeding 130° C., and maintained at a temperature in the general range 100° to 130° C., for a period of about 60 minutes, at which time plasticization of the zein had already been substantially completed as evidenced by disappearance of the zein and plasticizers as separate entities resulting in a uniform homogeneous plastic solution. Upon cooling to room temperature this product was found to be clear, transparent, substantially colorless and uniform when viewed in thin sections. It was a thermoplastic composition, which could when again heated be extruded and molded into formed plastic articles, such as plastic tubes, doorknobs, toys, and the like. These plastic articles were essentially odorless and tough and could be deformed and fractured only with difficulty.

*Example 2*

By weight 35 parts of N-amyl-butanimide and 5 parts of N-amyl-phthalimide were thoroughly mixed. The resultant mixture was then heated in a jacketed mixer to a temperature in the general range 120° C. to 135° C., while 60 parts of zein was gradually mixed in during the course of an hour. The plastic dough was further worked for a period of about 20 minutes, at which time a clear, homogeneous plastic solid solution had resulted and plasticization of the zein was substantially complete. Upon cooling a small portion to room temperature the product was found to be a clear, homogeneous, substantially transparent and colorless thermoplastic composition, relatively tough and pliable at ordinary temperatures, and thus directly usable as a plastic. When cooled to below 70° C., there was incorporated in the main plastic batch 30 parts by weight of rosin, or otherwise 30 parts by weight of the resinous water insoluble "Petrex" imide, and thereafter 5 parts of trioxymethylene. The batch was then sheeted on rubber-sheeting rolls and pieces were inserted into a mold of a suitable shape and were then pressed in a heated press at 250 lbs. per square inch at 135° C., for one half hour. This gave plastic articles generally similar to those produced by Example 1 but distinguished therefrom by not being thermoplastic and by having greater water-resistance. N-amyl-butanimide and N-amyl-phthalimide are both colorless, odorless, water insoluble liquids and have respective boiling points of 263° C., and 305° C., and they do not evaporate out of the prolamine plasticized compositions.

*Example 3*

A rubber-like plastic suitable for use as a shoesole was made by mixing in an internal mixer the following ingredients:

| | Parts by weight |
|---|---|
| Zein | 37 |
| N-(1-methylol-1-methyl,ethyl)phthalimide | 24.5 |
| Dibutyl-tartrate | 20.00 |
| Trioxymethylene | 1.5 |
| Clay | 12 |
| Carbon black | 5 |

N-(1-methylol-1-methyl,ethyl)phthalimide is a water insoluble odorless liquid boiling at a temperature of about 320° C. The zein and plasticizers were first entered into the internal mixer and after working for approximately one hour the pigments were added in small portions at a time so as to provide a homogeneous mixture. The working of the mass readily provides heat, and it was then cooled to below 80° C., by a water-cooled jacket upon the internal mixer. Thereafter the trioxymethylene was quickly introduced and milled in. The plastic mass was then removed from the internal mixer and sheeted out upon a rubber milling roll and portions of the thermoplastic uncured sheet were then placed within an ordinary shoesole mold such as is used in the rubber trade. Curing was then carried out by heating such mold to 130° C., for one-half hour under a hydraulic pressure of 100 to 500 lbs. per square inch. Such pressures have been found suitable in the manufacture of plastics from prolamines. The product was tough and flexible and in general had qualities similar to ordinary rubber shoesoles.

Example 4

As an example wherein there is employed a crude mixture of cereal proteins containing prolamines, hard prolamine plastic articles such as door knobs of a black color were made by molding under conditions similar to those used in Example 3, masses of the following plastic mixture:

| | Parts by weight |
|---|---|
| Corn gluten, 60% protein content | 40 |
| "Nevillac 10°" (coumarone-indene-phenol-resin)[1] | 30 |
| N-(carboxymethyl) phthalimide | 8 |
| N-(amyl) phthalimide | 2 |
| N-(hydroxyethyl) "Petrex"-imide | 5 |
| Asbestine | 8 |
| Channel black | 5 |
| Trioxymethylene | 2 |

[1] Composition unknown, except that it is one or more condensation products of paracoumarone, indene, or coal tar cuts rich in these, with phenol, generally with sulfuric acid as a catalyst.

In making the plastic mixture the plasticizers, resin and gluten were first mixed in a plastic masticating machine. The pigments were then incorporated by adding small portions at a time and the mass worked until it was thoroughly uniform. While still in the plastic machine, the mass was then cooled to 75° C., and the trioxymethylene quickly introduced. After further working for approximately 5 minutes to distribute the formaldehyde compound uniformly throughout the mass it was removed from the mixer and sheeted in milling rolls prior to actual molding operations at temperatures above 120° C. N-(carboxymethyl)-phthalimide is a white crystalline, odorless solid melting at 177° C., and boiling at 360° C. The N-(hydroxyethyl) "Petrex"-imide is a soft resinous material boiling above 340° C. Both materials are substantially water-insoluble.

Example 5

By weight 40 parts of zein and 60 parts of N-(1-methylolpropyl) phthalimide were dissolved at room temperatures in a solvent mixture consisting of about 30 parts by weight of methyl cellosolve and about 70 parts by weight of 95% (by volume) ethyl alcohol. N-(1-methylolpropyl) phthalimide is a light yellow ordorless water insoluble fluid boiling at 320° C. The resulting solution was found to be directly applicable for many uses; for example, for sizing, coating, impregnating and waterproofing textiles, paper, wood, tinplate and the like. As a coating material, the solution was eminently suited for application to varnished, lacquered, and the like surfaces. Further, it was found to form removable, strong, tough, pliable, transparent films when cast upon an oiled or waxed glass surface. In addition to these properties, the films were oil-resistant, hard and non-tacky in nature, and furnished an excellent surface for printing purposes. When applied to paper there resulted excellent grease- and moisture-proof coatings, giving flexible wrappings suitable for food stuff packaging. Coated upon tinplate the coating was found to withstand can-forming operations and repeated flexing without cracking. The coating was excellent in grease resistance.

Example 6

By weight 20 parts of cereal gluten derived from corn, 40 parts of N-(2-hyroxypropyl) butanimide, 10 parts of tetraethylene glycol and 25 parts of carbon black were thoroughly ground together on a roller mill. The resultant product was found to be suited for use as an ink for printing cotton bags.

Example 7

By weight 47 parts of zein, 53 parts of N-(hydroxyethyl)-hexenyl-butanimide, 90 parts of clay, 10 parts of basic lead carbonate, and about 50 parts of aqueous 80% (by volume) ethyl alcohol and 15 parts of ethyl lactate were thoroughly mixed and ground in a ball mill for a period of about 24 hours. The resultant composition was knife-coated onto a sized sheeting base, which was then force-dried for about 1 hour at a temperature of about 150° F. The resultant oilcloth base product exhibited excellent wearing qualities, resistance to flexing and to the action of water, acids, and greases. The imide plasticizers of the present invention offer the advantage that they may be employed with almost all types of pigments including the basic reactive ones such as zinc oxide, lithopones, zinc sulfide, and lead carbonates. N-(hydroxyethyl)hexenyl-butanimide is an odorless water-insoluble liquid boiling at 343° C.

Example 8

By weight 95 parts of zein, 5 parts of N-(para-hydroxy-phenyl) butanimide, 0.1 part by weight of oil soluble dyestuff Yellow OB, and about 240 parts of a solvent mixture consisting of 80 parts by weight of diacetone alcohol and 160 parts by weight of 95% (by volume) ethyl alcohol were mixed together overnight in a ball mill. The product was a shellac substitute eminently suited for coating wooden surfaces.

Example 9

By weight 75 parts of gliadin and 25 parts of N-(1-methylolpropyl) phthalimide were thoroughly mixed at room temperature. The resultant mixture was heated to a temperature of about 127° C., and maintained at a temperature in the general range from 120° C. to 135° C., for a period of about 35 minutes, at which time a clear, homogeneous solution, indicating complete plasticization of the gliadin, had resulted. Upon cooling to room temperature a clear, transparent, substantially colorless, thermoplastic product resulted. When dissolved at room temperature in a volatile solvent mixture consisting of about 65 parts by weight of 95% (by volume) ethanol, about 20 parts by weight of acetic acid, and about 15 parts by weight of water, the resultant composition exhibited excellent properties as a quick-drying water resistant adhesive. In place of the 75 parts of gliadin a similar glue may be made by substituting 75 parts of hordein. A similar adhesive may be made by using 25 parts of N-(hydroxyethylaminoethyl) phthalimide with 75 parts of gliadin.

Example 10

To 4 parts by weight of zein there was added 1 part by weight of sulfonated castor oil and 95 parts by weight of the liquid N-(amyl) butanimide. After the zein dissolved in the plasticizer the mixture was applied to rayon yarns as a size which provided such yarns with a certain amount of stiffening and served as an adhesive to hold such yarns together and further to lubricate the yarns during spinning operations. The mixture may be readily removed from the yarns when desired in ordinary desizing detergent scouring baths.

Example 11

Hexenyl-butanimide is an odorless water-insoluble liquid boiling at 345° C. By weight 45 parts of hexenyl-butanimide, 10 parts of carbon black, and 20 parts of whiting were mixed together and thoroughly ground on a roller mill. With the resultant mixture were incorporated, at room temperature, 55 parts of zein acetate and about 150 parts of a solvent mixture consisting of about 45 parts of ethylene glycol monomethyl ether and about 105 parts of isopropyl alcohol. The resultant homogeneous product was knife-coated onto a fabric base. The impregnated fabric was then baked at a temperature within the general range from 170° to 180° F., for a period of about 2 hours. The resultant material was a dull black artificial leather which was adaptable to embossing operations.

Example 12

Twenty grams of zein were dissolved in 50 ml. of 95% (by volume) ethyl alcohol and 18 ml. of commercial aqueous formalin (40% by volume), and the solution was treated in an autoclave at 15 lbs. steam pressure or about 120° C., for 1 hour. To the solution of prolamine reaction product thus produced there was then added 10 grams of N-(1-dimethylol-propyl)butanimide. Upon coating the lacquer thus produced upon metal castings, flexible clear coatings were secured, which when further heated for 3 hours at a temperature above 130° C., became quite water-resistant as well as grease resistant and highly flexible.

Example 13

To 7 parts by weight of a 63 per cent solids solution of the sodium salts of a sulfonated fatty acid and rosin mixture such as is secured as a byproduct in sulfate paper pulp digestion, and sold as sulfonated "Indusol," there was added 74 parts by weight of water, 1 part by weight of borax, 2 parts by weight of urea, and 4 parts by weight of the water soluble butanimide, (more commonly called succinimide). There was then introduced into this solution 15 parts by weight of a destarched, de-oiled corn gluten analyzing 73 per cent protein content and 1 part by weight of lampblack. and the whole slowly heated with continuous agitation to a temperature of about 165° F. After being maintained at a temperature in the general range from 160° to 170° F., for about 2 hours, the mixture had become a smooth paste. This was rollercoated onto a piece of cotton cloth having 80 x 80 threads per inch. A stiffened fabric, exhibiting a black finish, resulted. This prepared material was eminently suited for use as a window shade cloth since it was of appropriate stiffness for such a purpose and evidenced only very slight tendencies to crack upon aging after numerous flexings. The mixture was also satisfactorily employed as an interior wall paint, preferably after adding per 1 part by weight thereof 0.5 part by weight of water.

Example 14

A zein dispersion in water with ammonium rosinate was prepared according to the method of Drewsen and Little (U. S. Patent No. 2,247,531) as follows: First a paste of zein and aqueous ammonia was prepared in a mechanical mixer by incorporating therein 4 parts by weight of zein, 6 parts by weight of water and 1 part by weight of aqua ammonia (26° Bé.). Then a stiff homogeneous mixture of ammonium rosinate was prepared by thoroughly mixing for several hours at an elevated temperature not in excess of 200° F., 4 parts by weight (dry basis) of paper-maker's rosin and about 1 part by weight of aqua ammonia (25° Bé.). The prepared zein paste and ammonium rosinate were then thoroughly mixed, resulting in a zein rosinate composition. There was then added to the mix thus prepared 2 parts by weight of the water soluble N-(hydroxyethyl)-2-hydroxybutanimide as a plasticizer. In place of this as plasticizer there may be used 2 parts by weight of the water soluble sodium salt of N-(carboxymethyl)phthalimide. This was then employed to claycoat paper by first mixing it with a clay dispersion. A suitable clay dispersion was prepared by slurrying together 400 parts by weight of kaolin, 200 parts by weight of water and 5.5 parts by weight of sodium pyrophosphate. To 3 parts by weight of the clay slurry there was then added 1 part by weight of the plasticized zein dispersion, and the resulting coating product was screened. This material exhibited excellent qualities as a paper coater and gave a claycoated paper of satisfactory adhesion and wax pick test.

The foregoing description and examples will point out that the invention is subject to numerous embodiments not herein illustrated, but falling within the scope of the appended claims.

We claim:

1. A plasticized "prolamine-base" protein composition comprising plasticized "prolamine-base" protein having as plasticizer cyclic imide in which the total number of carbon atoms in the molecule is in the range from 4 through 14.

2. A plasticized "prolamine-base" protein composition comprising plasticized "prolamine-base" protein having as plasticizer substituted cyclic imide in which the total number of carbon atoms in the molecule is in the range from 4 through 14, and in which the nitrogen atom carries an hydroxylated organic radical.

3. A plasticized "prolamine-base" protein composition comprising plasticized "prolamine-base" protein having as plasticizer cyclic imide in which the total number of carbon atoms in the molecule is in the range from 4 through 14, and in which the nitrogen atom carries an organic radical including an amino radical selected from the group consisting of —$NH_2$ and =NH.

4. A plasticized "prolamine-base" protein composition comprising plasticized "prolamine-base" protein having as plasticizer substituted cyclic imide in which the total number of carbon atoms in the molecule is in the range from 4 through 14, and in which the nitrogen atom has an organic substituent.

5. A plasticized prolamine composition comprising plasticized zein having as plasticizer cyclic imide in which the total number of carbon atoms in the molecule is in the range from 4 through 14.

6. A plasticized "prolamine-base" protein composition comprising plasticized prolamine-carrying cereal gluten having as plasticizer cyclic imide in which the total number of carbon atoms in the molecule is in the range from 4 through 14.

7. A plasticized "prolamine-base" protein composition comprising plasticized "zein-base" protein having as plasticizer cyclic imide in which the total number of carbon atoms in the molecule is in the range from 4 through 14.

8. A plasticized "prolamine-base" protein composition consisting of plasticized "prolamine-base" protein having as plasticizer cyclic imide in which the total number of carbon atoms in the molecule is in the range from 4 through 14.

9. A plasticized prolamine composition consisting of plasticized zein having as plasticizer cyclic imide in which the total number of carbon atoms in the molecule is in the range from 4 through 14.

10. A plasticized "prolamine-base" protein composition consisting of plasticized prolamine-containing cereal gluten having as plasticizer cyclic imide in which the total number of carbon atoms in the molecule is in the range from 4 through 14.

11. A plasticized prolamine composition consisting of plasticized prolamine having as plasticizer cyclic imide in which the total number of carbon atoms in the molecule is in the range from 4 through 14.

12. A "prolamine-base" protein composition comprising by weight and in homogeneous association from 5 to 95 parts of "prolamine-base" protein, and as plasticizer therefor from 95 to 5 parts of cyclic imide in which the total number of carbon atoms in the molecule is in the range from 4 through 14.

13. A prolamine composition comprising by weight and in homogeneous association from 5 to 95 parts of zein, and as plasticizer therefor from 95 to 5 parts of cyclic imide in which the total number of carbon atoms in the molecule is in the range from 4 through 14.

14. A "prolamine-base" protein coating composition comprising dissolved "prolamine-base" protein, as plasticizer therefor dissolved cyclic imide in which the total number of carbon atoms in the molecule is in the range from 4 through 14, and a volatile mutual solvent for said materials.

15. A "prolamine-base" protein coating composition comprising from 5 to 95 parts of dissolved "prolamine-base" protein, as plasticizer therefor from 95 to 5 parts of dissolved cyclic imide in which the total number of carbon atoms in the molecule is in the range from 4 through 14, and a volatile mutual solvent for said materials.

16. A zein coating composition comprising from 5 to 95 parts of dissolved zein, as plasticizer therefor from 95 to 5 parts of dissolved cyclic imide in which the total number of carbon atoms in the molecule is in the range from 4 through 14, and a volatile mutual solvent for said materials.

17. A "prolamine-base" protein composition comprising in homogeneous association from 5 to 95 parts of "prolamine-base" protein, as plasticizer therefor from 95 to 5 parts of plasticizing cyclic imide characterized by carbon atoms in number in the range from 4 through 14 and by the essential grouping

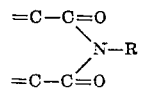

wherein R is selected from the group consisting of hydrogen and organic radicals.

18. A plasticized prolamine composition comprising plasticized gliadin having as plasticizer cyclic imide in which the total number of carbon atoms in the molecule is in the range from 4 to 14.

19. A plasticized prolamine composition comprising plasticized hordein having as plasticizer cyclic imide in which the total number of carbon atoms in the molecule is in the range from 4 to 14.

20. A plasticized prolamine composition consisting of plasticized gliadin having as plasticizer cyclic imide in which the total number of carbon atoms in the molecule is in the range from 4 to 14.

21. A plasticized prolamine composition consisting of plasticized hordein having as plasticizer cyclic imide in which the total number of carbon atoms in the molecule is in the range from 4 to 14.

22. A plasticized prolamine composition comprising plasticized prolamine having as plasticizer cyclic imide in which the total number of carbon atoms in the molecule is in the range from 4 through 14, and in which the nitrogen atom carries an organic radical including an amino radical selected from the group consisting of —$NH_2$ and =NH.

23. A plasticized prolamine composition comprising plasticized zein having as plasticizer cyclic imide in which the total number of carbon atoms in the molecule is in the range from 4 through 14, and in which the nitrogen atom carries an organic radical including an amino radical selected from the group consisting of —$NH_2$ and =NH.

WILLARD L. MORGAN.
CARL R. FAELTEN.

REFERENCES CITED

The following references are of record in the file of this patent:

UNITED STATES PATENTS

| Number | Name | Date |
|---|---|---|
| 2,326,728 | Schroy | Aug. 10, 1943 |
| 2,295,600 | Natelson et al. | Sept. 15, 1942 |
| 2,185,110 | Coleman | Dec. 26, 1939 |
| 2,115,716 | Hansen | May 3, 1938 |

Certificate of Correction

Patent No. 2,452,315. October 26, 1948.

WILLARD L. MORGAN ET AL.

It is hereby certified that error appears in the printed specification of the above numbered patent requiring correction as follows:

Column 14, line 4, for "(25° Bé.)" read *(26° Bé,)*;

and that the said Letters Patent should be read with this correction therein that the same may conform to the record of the case in the Patent Office.

Signed and sealed this 8th day of February, A. D. 1949.

[SEAL]

THOMAS F. MURPHY,
*Assistant Commissioner of Patents.*